United States Patent [19]

Baum et al.

[11] Patent Number: 5,948,322

[45] Date of Patent: Sep. 7, 1999

[54] SOURCE REAGENTS FOR MOCVD FORMATION OF NON-LINEAR OPTICALLY ACTIVE METAL BORATE FILMS AND OPTICALLY ACTIVE METAL BORATE FILMS FORMED THEREFROM

[75] Inventors: Thomas H. Baum, New Fairfield; Gregory Stauf, New Milford, both of Conn.; Daniel B. Studebaker, Brookline, Mass.; Brian A. Vaartstra, Nampa, Id.

[73] Assignee: Advanced Technology Materials, Inc., Danbury, Conn.

[21] Appl. No.: 08/838,587

[22] Filed: Apr. 10, 1997

[51] Int. Cl.⁶ ............................... G02F 1/35; G02B 5/20
[52] U.S. Cl. .................... 252/584; 106/287.18; 252/583; 252/588; 252/183.11; 385/147; 427/255.1
[58] Field of Search ..................... 252/583, 584, 252/588, 183.11; 501/12; 372/43; 106/287.18

[56] References Cited

U.S. PATENT DOCUMENTS 5,343,327  8/1994  Chai et al. ........................ 252/584 X

FOREIGN PATENT DOCUMENTS 0491141  6/1992  European Pat. Off. ................. 501/12
WO93/12037  6/1993  WIPO .................................... 252/584

OTHER PUBLICATIONS

Hirano, S., et al., "Preparation of β–BaB$_2$O$_4$ Powders and Thin Films by Sol–Gel Method", J. Am. Ceram. Soc., 75 [8]pp. 2590–2592 (1992).

Zhang, J., et al., "Single Liquid Source Plasma–Enhanced Metalorganic Chemical Vapor Deposition of High–Quality YBa$_2$Cu$_3$O$_{7-x}$ Thin Films", Appl. Phys. Lett. 61 (24), Dec. 14, 1992, pp. 2884–2886.

Liao, H. B., et al. "Preparation of Crystalline Beta Barium Borate (β–BaB$_2$O$_4$) Thin Films by Opposed Targets Magnetron Sputtering", J. Vac. Sci, Technol. A 14(4), Jul./Aug. 1996 American Vacuum Society, pp. 2651–2654.

Xiao, R. F., et al., "Preparation of Crystalline Beta Barium Borate (β–BaB$_2$O$_4$) Thin Films by Pulsed Laser Deposition", Appl. Phys. Lett. 67 (3), Jul. 17, 1995 American Institute of Physics, pp. 305–307.

Firestone, Millicent A., et al., "Chromophore–Functionalized Glassy Polymers with Large Second–Order Nonlinear Optical Responses. Synthesis, Characterization, and Architecture–Processing–Response Characteristics of Poly (p–hydroxystyrenes) Functionalized with Chiral Chromophoric Side Chains", 1995 American Chemical Society, Macromolecules 1995, 28, 2247–2259.

Bordui, Peter F., et al., "Inorganic Crystals for Nonlinear Optical Frequency Conversion", Annu. Rev. Mater. Sci. 1993, 23:321–379, pp. 321–379.

Primary Examiner—Richard D. Lovering
Attorney, Agent, or Firm—Steven J. Hultquist; Oliver A.M. Zitmann

[57] ABSTRACT

An MOCVD precursor composition useful for MOCVD formation of a non-linear optically active metal borate thin film, comprising: (I) an organometallic source reagent for a metal reactively forming a non-linear optically active metal borate, and (II) an organoborate compound of the formula: B(OR)$_3$, wherein each R is independently selected from H, alkyl, aryl, alkaryl, arylalkyl, alkenyl, fluoroalkyl, fluoroaryl, fluoroaralkyl, fluoroalkaryl, trialkylsilyl, and $C_5$–$C_8$ carbocylic groups, as the aforementioned borate source reagent. Such composition may be employed for forming a non-linear optically active metal borate thin film on a substrate, via depositing by CVD on said substrate a metal from the organometallic source reagent and a borate from the organoborate compound, to react the metal with the borate and yield the non-linear optically active metal borate on the substrate. Non-linear optically active devices, such as data storage devices, laser printers, display panels, and communications devices, can be fabricated using the composition and method of the invention.

18 Claims, 5 Drawing Sheets

SOURCE REAGENTS FOR MOCVD FORMATION OF NON-LINEAR OPTICALLY ACTIVE METAL BORATE FILMS AND OPTICALLY ACTIVE METAL BORATE FILMS FORMED THEREFROM

BACKGROUND OF THE INVENTION

1. Field of the Invention

This invention variously relates to source reagent compositions for forming non-linear optically active metal borate films on substrates by metalorganic chemical vapor deposition (MOCVD), to a method of forming a non-linear optically active metal borate film on a substrate by MOCVD utilizing such source reagent compositions, and to devices comprising non-linear optically active metal borate films.

2. Description of the Related Art

Nonlinear optical (NLO) materials have great potential in integrated optical devices for data storage, high-speed laser printers, large-area displays and communications. Many organic and inorganic materials have the requisite polarizability to be useful in NLO applications, but various parameters define the merit of the materials in a given device, including their ease of fabrication. Although organic non-linear materials are currently being extensively investigated for inherent advantages in structural processability, difficulties with purification, crystallization and stability have not been sufficiently overcome for commercial application.

Inorganic materials have been more extensively studied, and examples which have found their way into commercial devices include lithium niobate ($LiNbO_3$), potassium niobate ($KNbO_3$), potassium titanyl phosphate (KTP), lithium triborate ($LiB_3O_5$ or LiBO), ahd barium metaborate ($BaB_2O_4$, or BBO). Although these materials are well known in bulk single crystal form, only recently have they been considered in thin films for integrated circuit applications.

A number of potential advantages are apparent when considering thin films for NLO applications. Particularly in second harmonic generation (SHG), the use of NLO thin film waveguides is very attractive. For example, the thin film is inherently a planar waveguide, thereby eliminating other processing methods for formation of waveguides which can be detrimental to SHG coefficients. Thin films can also be deposited with high integrity morphology, which improves the damage thresholds, and reduces optical losses. Nonlinear morphologies can actually be more efficient in waveguide structures than in bulk materials, since large power densities can be maintained over longer interaction lengths. The waveguide can also be engineered such that large differences in refractive index confines the wave to the NLO material and thereby enhances the SHG efficiency. Another potential advantage is the ease of fabricating periodically poled structures on a thin film for quasi-phase matching. Furthermore, the scale up and processing costs of thin film technology offer great advantage over bulk crystal fabrication.

A film deposition method that has demonstrated considerable advantages over other methods is MOCVD. MOCVD is the method of choice for manufacturing many kinds of semiconductor materials in industry, thus facilitating the integration of a borate deposition process. The primary attraction of this technique for NLO materials is the potential for in-situ growth of epitaxial films. Although more complicated than sol-gel processes, MOCVD is viewed as the technique that will ultimately be used for device manufacture if epitaxial, phase-pure thin films can be formed at temperatures compatible with other device materials. Advantages of MOCVD for thin film oxide growth include the use of inexpensive apparatus, high throughput, and adaptability to large area conformal coverage.

Concerning specific applications of NLO materials, the use of NLO crystals to alter the frequency of incident laser radiation is currently the preferred method for obtaining laser radiation in the ultraviolet. Laser emission in this region is important for communications and high density data storage applications due to the shorter wavelength and smaller bit size that can be achieved. Using NLO materials, commercial visible wavelength lasers such as Nd:YAG can produce wavelengths in the UV region with high power density. The NLO materials considered most suitable for UV generation include $\beta$-$BaB_2O_4$ (BBO), $LiB_3O_5$, urea, and L-arginine phosphate (J. T. Lin, Opt. Quant. Elect. 22, S305, (1990)). The single-crystal values of the relevant $\chi^{\mathit{eff}(2)}$ index for these materials are $\beta$-$BaB_2O_4$, 4.6 pm/V; $LiB_3O_5$, 2.52 pm/V; urea, 2.61 pm/V; and L-arginine phosphate, 1.65 pm/V. Due to the acceptable $\chi_{\mathit{eff}}^{(2)}$ value, transparency in the ultraviolet, and high damage threshold, BBO is being actively investigated for applications in the ultraviolet region. Thus, BBO single crystals are used in commercial systems as frequency doublers and triplers for the 1.06 $\mu$m output of Nd:YAG lasers (CSK Optronics, 5519 Grosvenor Blvd., Los Angeles, Calif., 90066, SuperTripler 8310 series fact sheet). Crystals such as $LiIO_3$, $LiNbO_3$, $KNbO_3$, and KTP have higher $\chi_{\mathit{eff}}^{(2)}$ values than BBO but are not sufficiently transparent in the UV region (0.1–0.01 $\mu$m). For example, $LiIO_3$ is transparent to 300 nm whereas BBO is transparent to 190 nm. Other factors which make BBO attractive are the high damage threshold of >3 $GW/cm^2$ compared to 1 $GW/cm^2$ for most of the aforementioned materials.

Thin films of NLO materials have been heavily studied for applications as frequency converters, waveguides, switches, and storage devices. Waveguides of $LiNbO_3$ are commercially available (P. F. Bordui, and M. M. Fejer, in Annual Reviews of Materials Science, edited by R. A. Laudise, E. Snitzer, R. A. Huggins, J. A. Giordemaine, and J. B. Wachtman (Annual Reviews Inc., Palo Alto, 1993), Vol. 23, p. 321). High-quality thin films of BBO would be extremely attractive for integrated optical applications requiring UV waveguides. To date, oriented BBO thin films have been grown by pulsed laser deposition (R.-F. Xiao, L. C. Ng, P. Yu, and G. K. L. Wong, Appl. Phys. Lett. 67, 305 (1995)), and magnetron sputtering (H. B. Liao, R.F. Xiao, P. Lu, G. K. L. Wong, and J. Q. Zheng, J. Vac. Sci. Technol. A 14, 2651, (1996)) and less well-oriented films by sol-gel processing (S. Hirano, T. Yogo, K. Kikuta, and K. Yamagiwa, J. Am. Ceram. Soc. 75, 2590 (1992)).

Critical to optical properties of NLO thin films are homogeneity and morphological integrity. Potential contributions to high loss in films tested for waveguide applications appear to be scattering centers caused by particles or inhomogeneities, or by substrate attack during deposition and annealing. The latter lead to scattering losses from a rough interface. Clearly it would be advantageous to improve the process by using MOCVD, since deposition in situ, at lower temperatures, has better potential for preservation of the interface region.

It therefore is one object of the present invention to provide an MOCVD process producing high quality NLO materials.

It is another object of the present invention to provide precursor compositions for MOCVD formation of NLO materials.

Other objects and advantages will be more fully apparent from the ensuring disclosure and appended claims.

SUMMARY OF THE INVENTION

The present invention relates to source reagent compositions for forming non-linear optically active metal borate films on substrates by metalorganic chemical vapor deposition (MOCVD), to a method of forming a non-linear optically active metal borate film on a substrate by MOCVD utilizing such source reagent compositions, and to devices comprising non-linear optically active metal borate films.

More specifically, the invention in a compositional aspect relates to an MOCVD precursor composition having utility for MOCVD formation of a non-linear optically active metal borate thin film, such precursor composition comprising:

(I) an organometallic source reagent for a metal reactively forming a non-linear optically active metal borate with a borate derived from a source reagent therefor, and (II) an organoborate compound of the formula:

$$B(OR)_3$$

wherein each R is independently selected from H, alkyl, aryl, alkaryl, arylalkyl, alkenyl, fluoroalkyl, fluoroaryl, fluoroaralkyl, fluoroalkaryl, trialkylsilyl, and $C_5$–$C_8$ carbocylic groups, as the aforementioned borate source reagent.

In such MOCVD precursor composition, the metal of the organometallic source reagent may be selected from the group consisting of: barium, lithium, cesium, potassium, lead, neodymium, yttrium, aluminum, and non-linear optically active combinations thereof in which the organometallic source reagent comprises multiple organometallic source reagent compounds.

The non-linear optically active metal borate in the MOCVD precursor composition of the invention may for example be a compound such as $BaB_2O_4$, KBO, PbBaBO, NdYAlBO, or $CsLiBO_3$.

The organometallic source reagent in the above-described composition may for example comprise an organometallic source compound whose organo moiety is selected from the group consisting of beta-diketonates, beta-ketoimines, beta-ketoesters, alkoxides, and alkoxide-diketonates, and the organometallic source reagent may include an organometallic source compound adduct comprising a complexing ligand selected from the group consisting of tetraglyme, crown ethers and polyamines.

In another aspect, the present invention relates to a process for forming a non-linear optically active metal borate thin film on a substrate, comprising depositing by CVD on said substrate (1) a metal from an organometallic source reagent for a metal reactively forming a non-linear optically active metal borate with a borate derived from a source reagent therefor, and (2) an organoborate compound of the formula:

$$B(OR)_3$$

wherein: each R is independently selected from H, alkyl, aryl, alkaryl, arylalkyl, alkenyl, fluoroalkyl, fluoroaryl, fluoroaralkyl, fluoroalkaryl, trialkylsilyl, and $C_5$–$C_8$ carbocylic groups, to react the metal with the borate and yield the non-linear optically active metal borate on the substrate.

In still another aspect, the present invention relates to a non-linear optically active device, comprising a non-linear optically active metal borate thin film, whose metal constituent comprises a metal selected from the group consisting of Ba, Li, Cs, K, PbBa, and NdYAl. Such non-linear optically active device may variously comprise a data storage device, a laser printer, a display panel, or a communications device. The metal borate thin film may be formed by chemical vapor deposition.

A further aspect of the invention relates to a non-linear optically active device comprising a single crystal film of a non-linear optically active metal borate, whose metal constituent comprises a metal selected from the group consisting of Ba, Li, Cs, K, PbBa, and NdYAl, wherein the single crystal film exhibits a second order optical non-linearity in response to incident infrared or visible radiation.

Another aspect of the invention relates to a non-linear optically active film of a non-linear optically active metal borate, whose metal constituent comprises a metal selected from the group consisting of Ba, Li, Cs, K, PbBa, and NdYAl, wherein the single crystal film exhibits a second order optical non-linearity in response to incident infrared or visible radiation.

Other aspects, features and embodiments of the invention will be more fully apparent from the ensuing disclosure and appended claims.

DETAILED DESCRIPTION OF THE INVENTION, AND PREFERRED EMBODIMENTS THEREOF

The MOCVD precursor compositions of the present invention have utility for MOCVD formation of non-linear optically active metal borate thin films. Such films may be of any appropriate thickness, e.g., in the range of from 0.01 micrometer to 5 microns in thickness, and more narrowly in the range of from 0.05 micrometer to 2 microns in thickness.

The precursor compositions of the invention comprise (I) an organometallic source reagent for a metal reactively forming a non-linear optically active metal borate thin film, and (II) an organoborate compound of the formula:

$$B(OR)_3$$

wherein each R is independently selected from H, alkyl, aryl, alkaryl, arylalkyl, alkenyl, fluoroalkyl, fluoroaryl, fluoroaralkyl, fluoroalkaryl, trialkylsilyl, and $C_5$–$C_8$ carbocylic groups, as the borate source reagent.

In such composition, the metal of the organometallic source reagent may comprise one of the following metal species:

barium,
lithium,
cesium,
potassium,
lead,
neodymium,
yttrium,
aluminum, and
non-linear optically active combinations thereof in which the organometallic source reagent comprises multiple organometallic source reagent compounds.

In the organoborate compound, each of the R groups are independently selected from H, alkyl, aryl, alkaryl, arylalkyl, alkenyl, fluoroalkyl, fluoroaryl, fluoroaralkyl, fluoroalkaryl, trialkylsilyl, and $C_5$–$C_8$ carbocylic groups, so that each of the individual R groups may be the same as or different from the others. When an R group is an alkyl radical or comprises an alkyl moiety, such alkyl portion preferably is $C_1$–$C_8$ alkyl. When an R group is an aryl radical or comprises an aryl moiety, such aryl portion preferably is $C_6$–$C_{12}$ aryl. Alkenyl R groups preferably are $C_2$–$C_8$ alkenyl, e.g., vinyl or allyl. Trialkylsilyl R groups comprise alkyl groups which independently are preferably $C_1$–$C_4$ alkyl. $C_5$–$C_8$ carbocylic groups may be include substituted as well as unsubstituted carbocylic groups, which when substituted may comprise substituents such as $C_1$–$C_8$ alkyl, halo, amino, hydroxy, and the like. Preferred carbocylic groups include $C_5$–$C_6$ carbocylic groups.

Preferred non-linear optically active metal borates in the practice of the invention include $BaB_2O_4$, KBO, PbBaBO, NdYAlBO, and $CsLiBO_3$.

The organometallic source reagent may suitably comprise an organometallic source compound whose organo moiety is selected from the group consisting of beta-diketonates, beta-ketoimines, beta-ketoesters, alkoxides, and alkoxide-diketonates.

The organometallic source reagent may for example comprise an organometallic source compound adduct including a complexing ligand selected from the group consisting of tetraglyme, crown ethers and polyamines.

Crown ethers may be of any suitable type, as efficacious for the specific organometallic source compound involved, and the central metal atom species of such organometallic source compound. For example, the crown ethers may be (12 crown 4) ether in the case of lithium compounds, (18 crown 6) ether in the case of cesium and potassium compounds, (14 crown 5) ether in the case of lithium and potassium compounds, and other larger crown ethers in the case of barium, e.g., 20 crown 7 ether, or 22 crown 8 ether.

A preferred MOCVD precursor composition within the broad scope of the invention, having utility for MOCVD formation of a non-linear optically active metal borate thin film, comprises (I) an organometallic source reagent for a metal reactively forming a non-linear optically active metal borate with a borate derived from a source reagent therefor, such metal being selected from the group consisting of Ba, Li, Cs, K, PbBa, and NdYAl, with the organometallic source reagent comprising an organo ligand selected from the group consisting of beta-diketonates, beta-ketoimines, beta-ketoesters, alkoxides, and alkoxide-diketonates, and (II) an organoborate compound of the formula:

$B(OR)_3$ wherein each R is independently selected from H, alkyl, aryl, alkaryl, arylalkyl, alkenyl, fluoroalkyl, fluoroaryl, fluoroaralkyl, fluoroalkaryl, trialkylsilyl, and $C_5$–$C_8$ carbocylic groups, as the borate source reagent.

In such MOCVD precursor composition, the organometallic source reagent may advantageously comprise a complexing ligand such as tetraglyme or a polyamine, with the borate source reagent in the form of an adduct.

The foregoing compositions of the invention may be employed in a process for forming a non-linear optically active metal borate thin film on a substrate, by depositing via CVD on the substrate a metal from the organometallic source reagent, and a borate from the organoborate compound of the composition, to react the metal with the borate and yield the non-linear optically active metal borate on the substrate.

The CVD process may be of any suitable type, including assisted types such as plasma CVD, laser CVD, etc. Preferably, the CVD process is a thermally driven CVD process. Suitable process conditions may be readily determined without undue experimentation by those skilled in the art of CVD formation of films and coatings.

In such process, the substrate may be of any suitable type, e.g., formed of or containing silicon dioxide.

Non-linear optically active devices which may be formed by the above-described MOCVD process include data storage devices, laser printers, display panels, and communications devices. The MOCVD process may be carried out under any suitable process conditions of temperature, pressure, flow rate, composition, and concentrations of the organometallic source reagent and organoborate compound relative to one another, as may be readily determined without undue experimentation by those skilled in the art.

Figure 1:
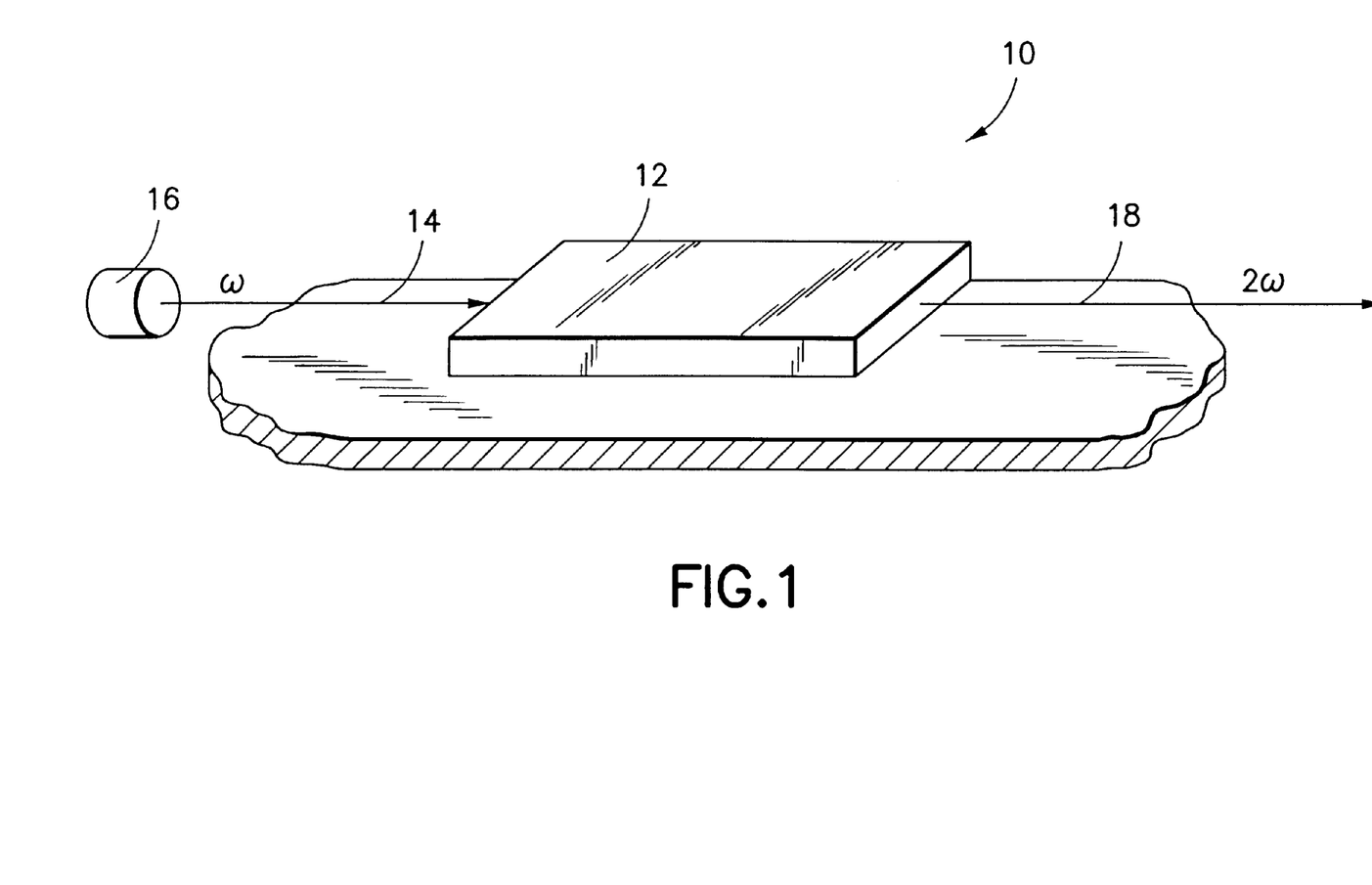
FIG. 1 is a schematic representation of a non-linear optically active device comprising a single crystal film of a non-linear optically active metal borate, which exhibits a second order optical non-linearity in response to incident radiation.

FIG. 1 is a schematic representation of a non-linear optically active device 10 comprising a single crystal film 12 of a non-linear optically active metal borate, which exhibits a second order optical non-linearity in response to incident radiation 14 supplied by radiation source 16. The radiation source 16 may comprise a visible or ultraviolet radiation source. The stimulated radiation emission 18 from the single crystal film is doubled in frequency in relation to the incident radiation 14.

The single crystal film shown in FIG. 1 may be formed on a suitable substrate by chemical vapor deposition from suitable source reagent materials, to yield an optically active non-linear film of the metal borate compound, as for example a barium borate film. The single crystal non-linear optically active thin film material of the invention may be employed in a wide variety of device applications, including data storage devices, laser printers, display panels, and communications devices.

Thin films of beta barium borate (β-$BaB_2O_4$) may be formed in accordance with the invention by metal-organic chemical vapor deposition (MOCVD) on a wide variety of substrates, including fused silica, sapphire, platinum, $MgF_2$, LiF and silicon substrates. Deposition conditions may be readily determined to reproducibly grow β-$BaB_2O_4$ films of a desired character, e.g., with the c-axis normal to the substrate.

By way of illustration, film growth of BBO in accordance with the invention may be carried out in an inverted vertical MOCVD reactor of the type disclosed in J. Zhang, R. A. Gardiner, P. S. Kirlin, R. W. Boerstler, and J. Steinbeck, Appl. Phys. Lett. 61, 2882 (1992), or in any other suitable MOCVD reactor. The precursor composition may for example be constituted by an organic solution containing triisopropyl borate (B(OPr)$_3$) and Ba(thd)$_2$.tetraglyme, which is transported to the MOCVD reactor at a suitable flow rate, e.g., ~7 mmol/h, by a liquid delivery system of appropriate character, e.g., a liquid delivery system commercially available from Advanced Technology Materials, Inc. under the trademark Sparta. The above-described illustrative precursor solution may be "flash" vaporized in the liquid delivery system, and transported to the substrate in a nitrogen carrier gas stream, e.g., at a rate of 200 sccm. Oxidizer gases, oxygen and nitrous oxide, are introduced into the MOCVD reactor at suitable rates, e.g., 150 sccm, while the base pressure was maintained at appropriate level, e.g., 0.85 Torr.

Films may be formed under the above-described process conditions on substrates, e.g., fused silica, platinum, sapphire, $MgF_2$, LiF and silicon substrates, at susceptor temperatures from about 640° C. to about 840° C., and substrate surface temperatures on the order of about 100° C. lower than such susceptor temperature values. Films may for example be deposited for a suitable duration, e.g., 1 hour, to yield film thicknesses on the order of 0.4 to 0.5 $\mu$m, depending on the exact processing conditions. After deposition, the MOCVD chamber is desirably slowly back-filled with nitrogen or other appropriate gas, while the susceptor temperature is reduced, e.g., at a rate of 5° C./min. A slow cooldown is desired to minimize cracking of the deposited film.

Second-order nonlinear optical characterization of the BBO films formed in accordance with the present invention may be effected with second-harmonic generation (SHG) measurement techniques, such as those described in M. A. Firestone, J. Park, N. Minami, M. A. Ratner, T. J. Marks, W. Lin, and G. K. Wong, Macromolecules 28, 2247 (1995), using the 1.064 $\mu$m output of a Q-switched Nd:YAG laser operating at 10 Hz repetition frequency as the pump beam. The SHG signal may be separated by a monochrometer from the fundamental beam and detected using a photomultiplier tube and processed by a gated integrator. The deposited film may be mounted on a rotation stage to enable rotation of the sample about the axis either normal to or in the plane of its surface. A suitable reference, e.g., a Y-cut quartz crystal plate, may be employed to determine the magnitude of the effective second-order optical nonlinearity, $\chi_{eff}^{(2)}$, of the BBO film.

For waveguiding applications, which require substrates with lower refractive indices than BBO (n=1.56 at 0.5 $\mu$m), BBO films may be grown on fused silica ($SiO_2$) (n=1.46 at 0.5 $\mu$m). The BBO film may be grown in various orientations, e.g., [006], [113], etc., with [006] being preferred, and exhibiting good SHG response, with $\chi_{eff}^{(2)}$ values which may be on the order of 0.1–4.0 pm/V.

Based on the relative intensities of orientations in the O–2O x-ray diffraction pattern, the preferred Ba:B precursor solution stoichiometry is 1:2.5. The excess boron required for stoichiometric BBO film growth may result from the difference in precursor thermal stabilities, reaction incorporation efficiencies, or preferential vaporization of $B_2O_3$ from the growing film. For the range of substrate temperatures generally employed in the practice of the invention, $B_2O_3$ is volatile with a melting point of 450° C.

Figure 2:
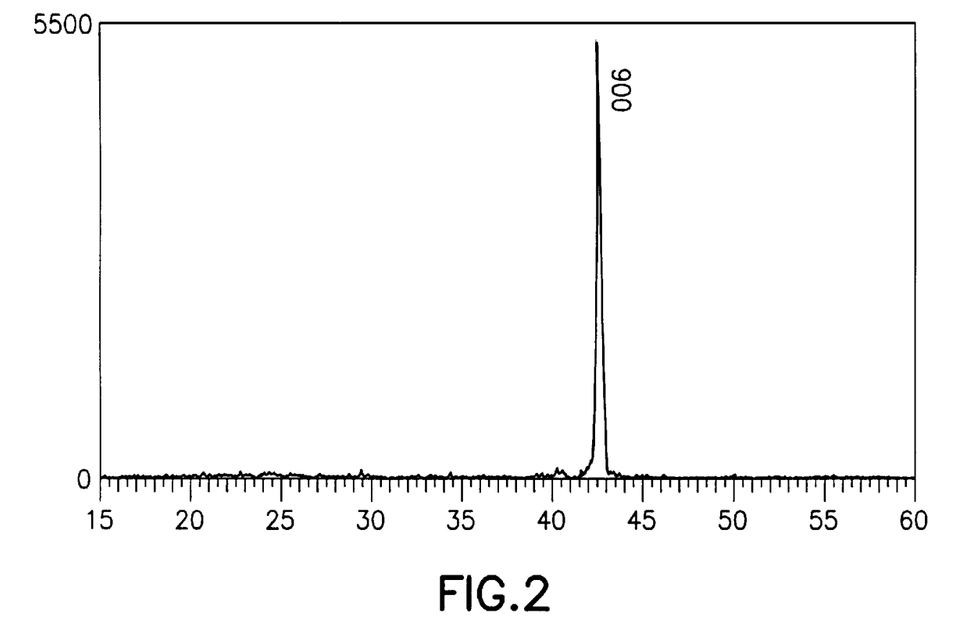
FIG. 2 is an X-ray diffraction pattern of $\beta$-$BaB_2O_4$ grown on fused silica ($\chi_{eff}^{(2)}$=0.78 pm/V).

FIG. 2 is an illustrative X-ray diffraction (XRD) pattern of $\beta$-$BaB_2O_4$ grown on fused silica ($\chi_{eff}^{(2)}$=0.78 pm/V). The highest intensity [006] reflection of such BBO is observed at susceptor temperatures on the order of 720° C. The film is oriented in the [006] direction with small features in the 39–41° region of the O–2O scan ($\alpha$-BBO orientation).

Figure 3:
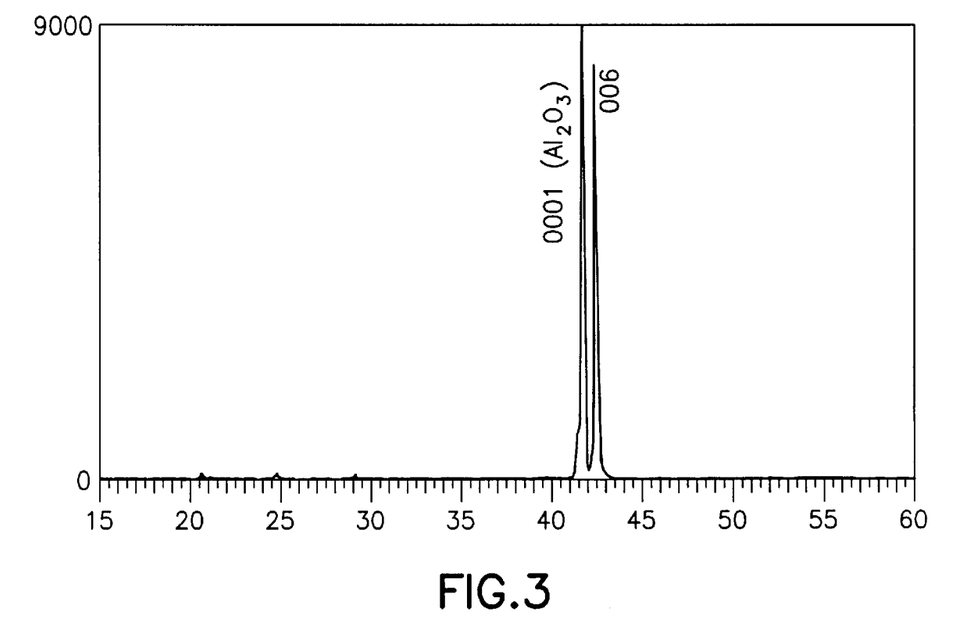
FIG. 3 is an X-ray diffraction pattern of $\beta$-$BaB_2O_4$ grown on sapphire ($\chi_{eff}^{(2)}$=1.6 pm/V).

FIG. 3 is another illustrative X-ray diffraction pattern of $\beta$-$BaB_2O_4$ grown on sapphire ($\chi_{eff}^{(2)}$=1.6 pm/V). The substrate was r-cut, single crystal sapphire ($Al_2O_3$), an inexpensive substrate commonly used in optical applications. The highest quality films grown on sapphire are grown at temperature levels on the order of about 720° C., with a slight excess of boron in the precursor solution. The x-ray diffraction pattern reveals that the BBO film is highly oriented in the [006] direction, with very small amounts of crystallites (<1%) oriented in the [300] and [104] directions. SHG measurements of this film yielded a $\chi_{eff}^{(2)}$ of 1.6 pm/V. This increase in SHG of the BBO film on $Al_2O_3$ as compared to the BBO film on amorphous $SiO_2$, is most likely due to the higher crystallinity, a consequence of the crystalline substrate.

Figure 4:
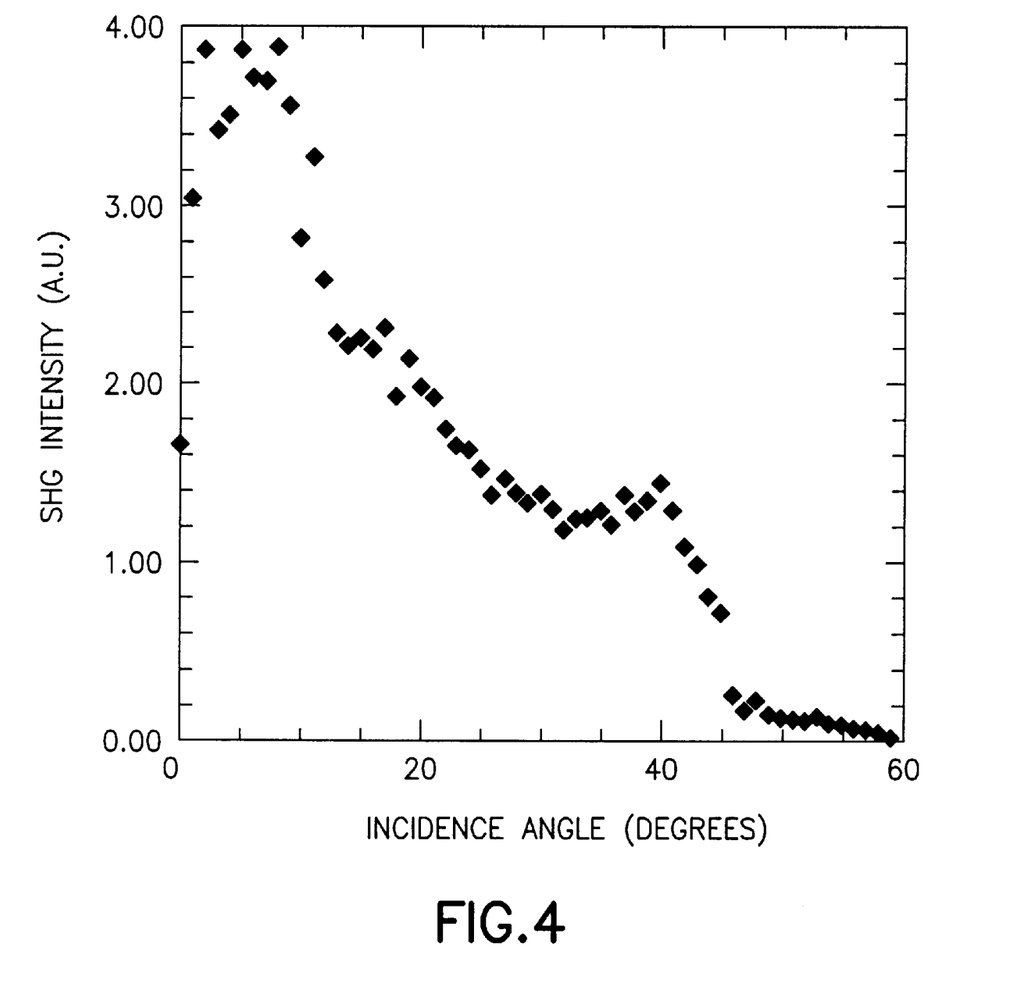
FIG. 4 is a graph of SHG Intensity as a function of incident angle of the laser source.
Figure 5:
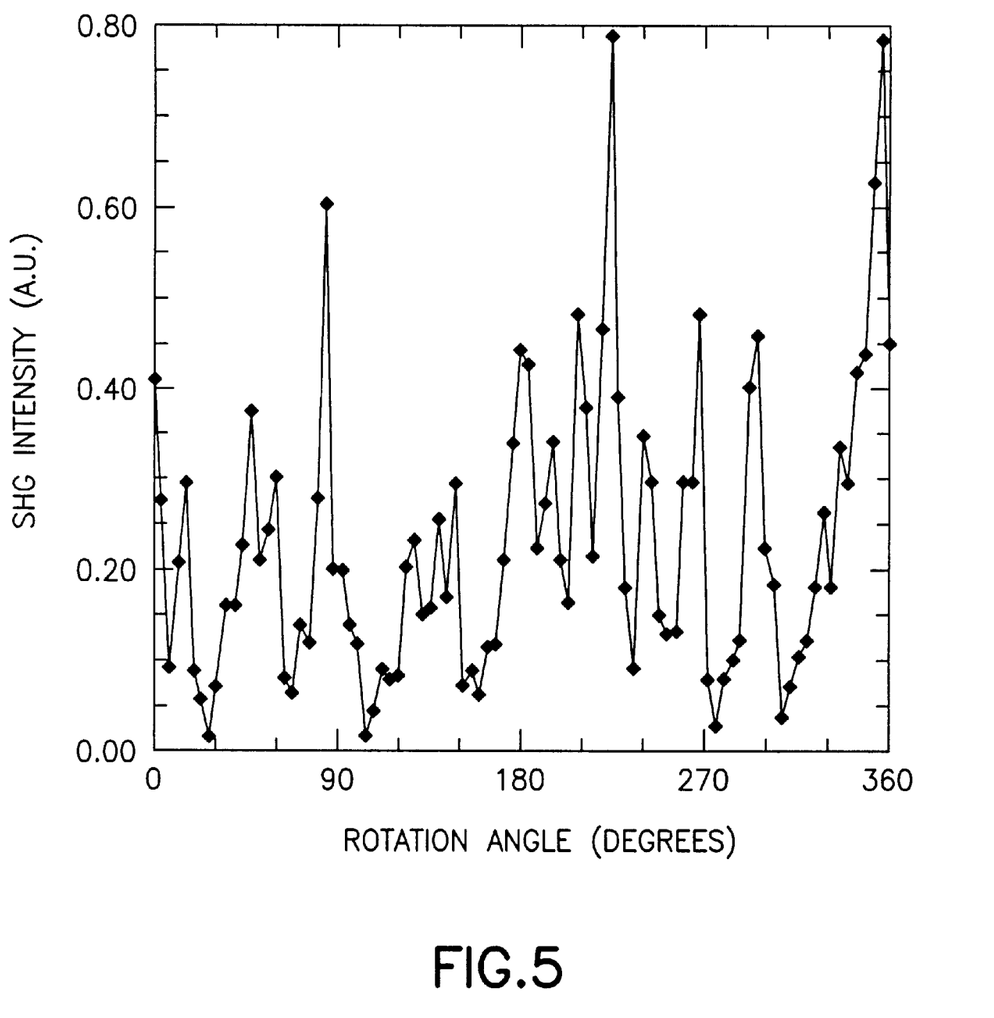
FIG. 5 is a graph of SHG Intensity as a function of rotation angle of the film.

FIG. 4 is a graph of SHG Intensity as a function of the fundamental beam incident angle of the laser source, for an MOCVD-derived BBO film on sapphire. As shown, the maximum SHG response near normal incidence (q~0°) is observed and indicates that the a and b axes of the BBO film are in the film plane, consistent with the X-ray diffraction results. FIG. 5 is a graph of SHG Intensity as a function of rotation angle of the film about the surface normal, for an MOCVD-derived BBO film on sapphire.

Figure 6:
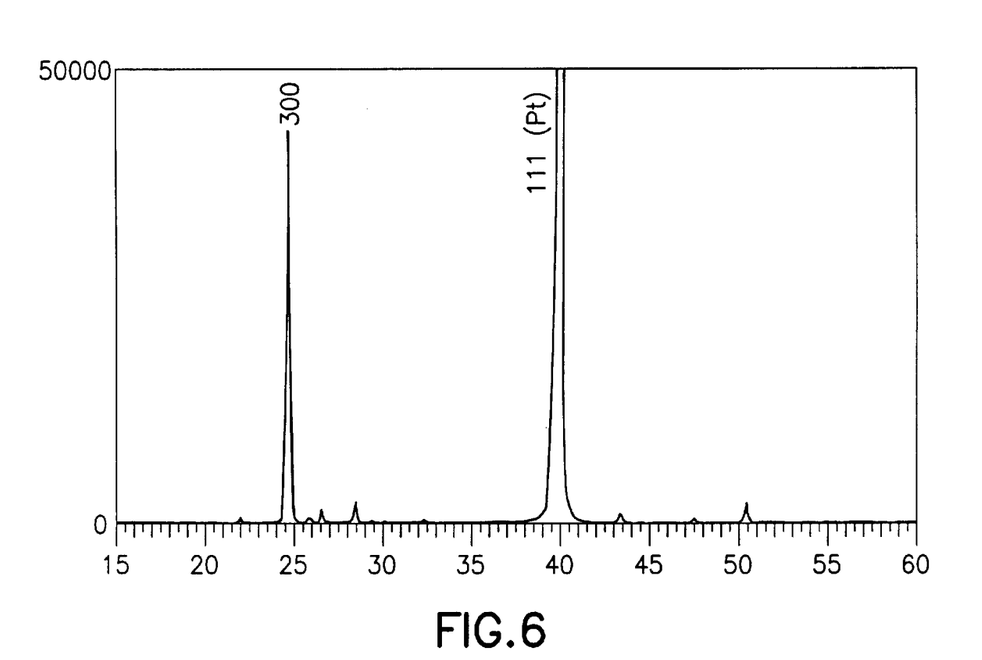
FIG. 6 is an X-ray diffraction pattern of $\beta$-$BaB_2O_4$ grown on platinum with a barium-rich solution.
Figure 7:
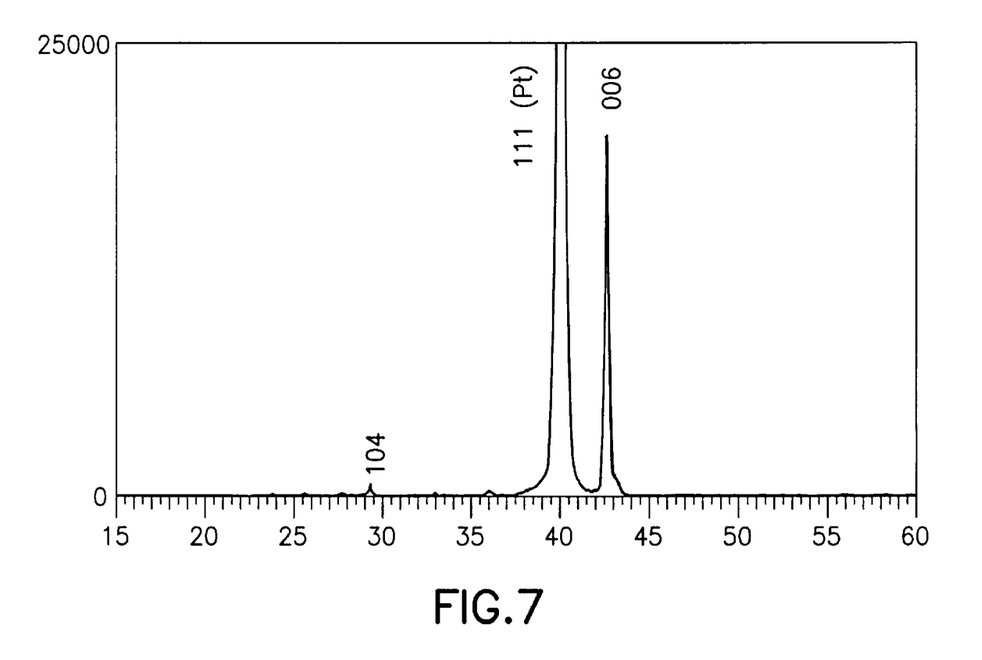
FIG. 7 is an X-ray diffraction pattern of $\beta$-$BaB_2O_4$ grown on platinum with a boron-rich solution.

Thin films of BBO deposited by MOCVD on a platinum surface are more highly oriented than films deposited by sol-gel methods. FIG. 6 is an X-ray diffraction pattern of an MOCVD-derived film of $\beta$-$BaB_2O_4$ grown on platinum with a barium-rich solution, indicating growth in the [300] orientation. FIG. 7 is an X-ray diffraction pattern of an MOCVD-derived film of $\beta$-$BaB_2O_4$ grown on platinum with a boron-rich solution, exhibiting an [006] orientation. BBO films grown on platinum at a delivery rate of 7 mmol/h are preferentially ordered with over 95% of the grains ordered in a single direction, but when the delivery rate is higher, e.g., 10 mmol/h, the deposited films are polycrystalline.

BBO films grown on [100] silicon with an [006] orientation may be obtained at a variety of reactor pressures and solution stoichiometries.

In a preferred aspect of the invention, crystalline $\beta$-$BaB_2O_4$ thin films are formed by MOCVD on a substrate such as fused silica, sapphire, platinum coated silicon, or silicon, preferentially (>95%) oriented in the [006] direction.

The features and advantages of the invention are more fully shown by the following non-limiting examples.

EXAMPLE I

Barium (II) bis (2,2,6,6,-tetramethyl-3,5-heptanedionato) tetraglyme, an appropriate quantity of trialkyl borate were dissolved in n-butyl acetate and tetraglyme (25:1) and used for liquid delivery MOCVD film growth. The mixed solution was delivered to a heated vaporizer region heated between 150 and 300° C., using a commercial liquid delivery system, and "flash" vaporized to produce gaseous precursors. Using an appropriately heated substrate and co-reactant oxidizer gases, a preferred crystalline phase of BBO could be grown. Second harmonic generation (SHG) was observed in the thin-film deposited by this approach. By optimization of the CVD process, the optical properties of the deposited film may be correspondingly optimized.

EXAMPLE II

In a modification to Example I, a solution containing barium (II) bis (2,2,6,6,-tetramethyl-3,5- heptanedionato) and tri(isopropyl) borate was dissolved in tetrahydrofuran and tetraglyme (25:1) solution. This solution was delivered (using a commercial liquid delivery system) to a CVD reactor to produce high quality, epitaxial BBO films. The decomposition was performed in the presence of $O_2$ and/or nitrous oxide to facilitate clean decomposition of the source (precursor) materials. The deposited BBO film exhibits second harmonic generation and non-linear optical properties.

EXAMPLE III

In a modification to Example II, barium (II) bis (2,2,6, 6,-tetramethyl-3,5-heptanedionato) pentamethylethylenetriamine complex was dissolved in a solution containing tri(isopropyl) borate, where n-butyl acetate and triamine are solvents. The presence of the triamine facilitates the transport of barium precursor and helps to thermally stabilize the complex during vaporization Thus, a more robust and manufacturable CVD process can be realized via enhanced vaporizer lifetimes. The deposited films were observed to have non-linear optical properties.

EXAMPLE IV

A solution consisting of (12 crown 4) lithium (2,2,6,6,-tetramethyl-3,5-heptanedionato) was dissolved in an organic solvent, such as tetrahydrofuran, i-propanol and (12 crown 4) cyclic polyether in an 8:2:1 ratio, and containing a tri(isopropyl) borate co-reactant. The lithium to boron precursor concentrations were adjusted to produce the desired film stoichiometry. The solution was pumped to a heated vaporization zone and the gaseous precursors were introduced into a CVD reactor. The substrate was heated to temperature between 500° C. and 800° C. in a strongly oxidizing environment containing $O_2$ and/or nitrous oxide co-reactants. The deposited LBO film is crystalline and exhibits non-linear optical effects and harmonic generation.

EXAMPLE V

In a modification of example IV, a solution containing (12 crown 4) lithium (2,2,6,6,-tetramethyl-3,5-heptanedionato) and tri(isopropyl) borate co-reactant were dissolved in an organic solvent of n-butylacetate and (12 crown 4) in a ratio of 25:1. The solution was pumped to a heated vaporization zone and "flash" vaporized into the CVD reactor. The decomposition of the precursors occurs at an elevated substrate temperature (500–800° C.) in the presence of oxidants, such as $O_2$ and/or nitrous oxide. The deposited LBO film exhibits non-linear optical effects and second harmonic generation.

EXAMPLE VI

A solution consisting of tetraglyme lithium (2,2,6,6,-tetramethyl-3,5-heptanedionato) containing tri(isopropyl) borate was dissolved in a solution of n-butyl acetate and tetraglyme. The solution was delivered to a heated vaporization zone, using a liquid delivery system and "flash" vaporized into the CVD reactor. The lithium to boron precursor ratio and solution concentrations were adjusted to produce the desired film stoichiometry. The deposited film exhibits useful optical properties and harmonic generation.

EXAMPLE VII

A solution consisting of tetraglyme lithium (2,2,6,6,-tetramethyl-3,5-heptanedionato) containing tri(alkyl) borate was dissolved in a solution of n-butyl acetate and tetraglyme. The solution was delivered to a heated vaporization zone, using a liquid delivery system and "flash" vaporized into the CVD reactor. The lithium to boron precursor ratio and solution concentrations were adjusted to produce the desired film stoichiometry. The deposited film exhibits useful optical properties and harmonic generation.

EXAMPLE VIII

A solution consisting of tetraglyme cesium (2,2,6,6,-tetramethyl-3,5-heptanedionato), tetraglyme lithium (2,2,6,6,-tetramethyl-3,5-heptanedionato) containing tri(alkyl) borate was dissolved in a solution of n-butyl acetate and excess tetraglyme. The solution was delivered to a heated vaporization zone, using a liquid delivery system and "flash" vaporized into the CVD reactor. The lithium to cesium to boron precursor ratio and solution concentrations were adjusted to produce the desired film stoichiometry of $CsLiB_3O_5$. The deposited film exhibits useful optical properties and harmonic generation.

EXAMPLE IX

A solution consisting of (18 crown 6) cyclic polyether cesium (2,2,6,6,-tetramethyl-3,5-heptanedionato), (12 crown 4) lithium (2,2,6,6,-tetramethyl-3,5-heptanedionato) containing tri(alkyl) borate was dissolved in a solution of n-butyl acetate and tetraglyme. The solution was delivered to a heated vaporization zone, using a liquid delivery system and "flash" vaporized into the CVD reactor. The lithium to cesium to boron precursor ratio and solution concentrations were adjusted to produce the desired film stoichiometry of $CsLiB_3O_5$. The deposited film exhibits useful optical properties and harmonic generation.

EXAMPLE X

A solution consisting of (18 crown 6) cyclic polyether cesium (2,2,6,6,-tetramethyl-3,5-heptanedionato), tetraglyme lithium (2,2,6,6,-tetramethyl-3,5-heptanedionato) containing tri(alkyl) borate was dissolved in a solution of n-butyl acetate and crown ether. The solution was delivered to a heated vaporization zone, using a liquid delivery system and "flash" vaporized into the CVD reactor. The cesium/lithium/boron precursor ratio and solution concentrations were adjusted to produce the desired film stoichiometry. The deposited film exhibits useful optical properties and harmonic generation.

EXAMPLE XI

A solution consisting of (18 crown 6) cyclic polyether cesium (2,2,6,6,-tetramethyl-3,5-heptanedionato), tetraglyme lithium (2,2,6,6,-tetramethyl-3,5-heptanedionato) containing tri(alkyl) borate was dissolved in a solution of n-butyl acetate and tetraglyme. The solution was delivered to a heated vaporization zone, using a liquid delivery system and "flash" vaporized into the CVD reactor. The cesium/lithium/boron precursor ratio and solution concentrations were adjusted to produce the desired film stoichiometry. The deposited film exhibits useful optical properties and harmonic generation.

EXAMPLE XII $Li(thd)[B(OCH_3)_3]_3$

In this example, in which thd=2,2,6,6-tetramethyl-3,5-heptanedionate, a mixture of Li(thd) and a trialkyl borate are employed to form an adduct which contains alkoxide bridging groups between Li and boron atoms. The material of interest in this example is lithium triborate, and ideally the adduct contains three boron equivalents per lithium atom. In a CVD process, it is not be necessary that an adduct is formed, or if the trialkyl borate is only weakly bound to the Li compound, that the adduct dissociate during vapor transport. Critical to the CVD process is the deposition of $LiB_3O_5$ in its optimum non-linear morphology. Compensation for deposition rates of individual components can be accomplished by vaporizing more or less of one particular precursor.

EXAMPLE XIII

Highly (006) oriented films on fused silica were reproducibly grown. Second harmonic generation was observed in these films. The first films measured showed $\chi_{effective}$ values of 28 times less than that of bulk BBO.

The general run parameters were as follows:

| | |
|---|---|
| Susceptor temperature | 720° C. |
| Injector temperature | 225° C |
| Syringe speed | 6 |
| $N_2$ carrier gas | 200 sccm |
| $O_2$ oxidizer gas | 150 sccm |
| $N_2O$ oxidizer gas | 150 sccm |
| Chamber pressure | 0.85 Torr |
| Frit pressure | 92 Torr |

The susceptor was ramped up to deposition temperature at 15° C./min. The carrier gas flow was turned on for approximately a minute before the oxidizer gases were turned on. The solution introduced immediately after the oxidizer gases were turned on. After the run was over, everything was turned off except for the carrier gas. The temperature was ramped down at 5° C./min. to room temperature. The slow rate was chosen to minimize the occurrence of cracking in the films due to differences in thermal expansion coefficients between the film and the substrate.

A substrate with a lower index of refraction is desired for waveguiding applications. Fused silica has a lower index of refraction, and is relatively inexpensive. Film growth was carried out on fused silica, determining that it is a suitable substrate since the beta phase was observed in the XRD. A few runs were also done on sapphire, producing highly (006) oriented films.

ICP studies were performed after dissolution of the deposited films. The results showed that the ratio of Ba:B was on average 9:1. The solution stoichiometry was initially selected as 1:1 $B(OR)_3$ to $Ba(thd)_2$. But a series of runs were done which varied the Ba:B ratio in solution ranged from 1:1 to 1:4. The quality of these films was measured by XRD. The results of the x-ray diffraction showed that the best film was grown from a solution with a Ba:B ratio of 1:2.3.

A series of runs was conducted to determine the effect of susceptor temperature on the XRD. The best films were grown at 720° C. The (006) orientation was deposited at 640° C., the lowest temperature attempted. All the temperatures were measured from the inside of the susceptor, and therefore the actual temperature of the substrate surface was much lower.

The thicknesses of the films were calculated from UV-vis measurements. The films were on average about 0.5 microns thick. The XRD results suggested that films oriented in the (006) direction are more desirable than films oriented in the (113) direction. Films oriented in the (006) direction have much better XRD patterns and exhibit second harmonic generation (SH6).

While the invention has been illustratively disclosed herein with reference to specific exemplary aspects, features and embodiments, it will be appreciated that the utility of the present invention is not thus limited, but rather extends to and encompasses other variations, modifications and embodiments of the invention. The claims therefore are to be construed and interpreted to encompass all such other variations, modifications and embodiments within its spirit and scope.

What is claimed is:

1. A non-sol gel MOCVD precursor composition having utility for MOCVD formation of a non-linear optically active metal borate thin film, said precursor composition comprising: (I) an organometallic source reagent for a metal reactively forming with a borate derived from a source reagent therefor a non-linear optically active metal borate thin film, and (II) an organoborate compound of the formula:

$$B(OR)_3$$

wherein each R is independently selected from the group consisting of H, alkyl, aryl, alkaryl, arylalkyl, alkenyl, fluoroalkyl, fluoroaryl, fluoroaralkyl, fluoroalkaryl, trialkylsilyl, and $C_5$–$C_8$ carbocyclic groups, as said borate source reagent.

2. An MOCVD precursor composition according to claim 1, wherein said metal of said organometallic source reagent is selected from the group consisting of:

barium,
lithium,
cesium,
potassium,
lead,
neodymium,
yttrium,
aluminum, and
non-linear optically active combinations thereof in which said organometallic source reagent comprises multiple organometallic source reagent compounds.

3. An MOCVD precursor composition according to claim 2, wherein said non-linear optically active metal borate is selected from the group consisting of $BaB_2O_4$, KBO, PbBaBO, NdYAlBO, $LiB_3O_5$ and $CsLiBO_3$.

4. An MOCVD precursor composition according to claim 1, wherein said organometallic source reagent comprises an organometallic source compound whose organo moiety is selected from the group consisting of beta-diketonates, beta-ketoimines, beta-ketoesters, alkoxides, and alkoxide-diketonates.

5. An MOCVD precursor composition according to claim 1, wherein said organometallic source reagent comprises an organometallic source compound adduct including a complexing ligand selected from the group consisting of tetraglyme, crown ethers and polyamines.

6. A composition according to claim 1, wherein each R is independently selected from the group consisting of H, aryl, alkaryl, arylalkyl, alkenyl, fluoroalkyl, fluoroaryl, fluoroaralkyl, fluoroalkaryl, trialkylsilyl, and $C_5$–$C_8$ carbocyclic groups.

7. A composition according to claim 1, wherein the organometallic source reagent comprises a metal beta-diketonate.

8. A composition according to claim 1, wherein the organometallic source reagent comprises an organometallic source compound adduct including a complexing ligand selected from the group consisting of tetraglyme and polyamines.

9. A composition according to claim 1, wherein the organometallic source reagent comprises an organometallic source compound adduct including a tetraglyme complexing ligand.

10. A composition according to claim 1, wherein the organometallic source reagent comprises an organometallic source compound adduct including a polyamine complexing ligand.

11. A composition according to claim 1, wherein the organometallic source reagent comprises an organo moiety selected from the group consisting of beta-diketonates, beta-ketoimines, and beta-ketoesters.

12. A composition according to claim 1, wherein the organometallic source reagent comprises a beta-diketonate organo moiety.

13. A composition according to claim 1, including an organic solvent for the organometallic source reagent and organoborate.

14. A composition according to claim 13, wherein the organic solvent comprises at least one solvent component selected from the group consisting of n-butyl acetate, tetraglyme, tetrahydrofuran, triamine, isopropanol, crown ether, and crown cyclic polyether.

15. A composition according to claim 1, wherein boron is in stoichiometric excess to the metal constituent of the organometallic source reagent.

16. A composition according to claim 1, wherein the ratio of boron to the metal constituent of the organometallic source reagent is from 1 to 4.

17. A non-sol gel MOCVD precursor composition having utility for MOCVD formation of a non-linear optically active metal borate thin film, said precursor composition comprising: (I) an organometallic source reagent for a metal reactively forming a non-linear optically active metal borate with a borate derived from a source reagent therefor, said metal being selected from the group consisting of Ba, Li, Cs, K, PbBa, and NdYAl, and said organometallic source reagent comprising an organo ligand selected from the group consisting of beta-diketonates, beta-ketoimines, beta-ketoesters, alkoxides, and alkoxide-diketonates, and (II) an organoborate compound of the formula:

$$B(OR)_3$$

wherein each R is independently selected from the -group consisting of H, alkyl, aryl, alkaryl, arylalkyl, alkenyl, fluoroalkyl, fluoroaryl, fluoroaralkyl, fluoroalkaryl, trialkylsilyl, and $C_5$–$C_8$ carbocyclic groups, as said borate source reagent.

18. An MOCVD precursor composition according to claim 17, wherein said organometallic source reagent comprises a complexing ligand selected from the group consisting of tetraglyme, crown ethers and polyamines.

* * * * *

UNITED STATES PATENT AND TRADEMARK OFFICE
CERTIFICATE OF CORRECTION

PATENT NO. : 5,948,322
DATED : September 7, 1999
INVENTOR(S) : Thomas H. Baum, et al It is certified that error appears in the above-identified patent and that said Letters Patent is hereby corrected as shown below:

Column 1, Line 33, change "ahd" to --and--
Column 2, Line 17, change "$\chi^{eff(2)}$" to --$\chi_{eff}^{(2)}$--

Signed and Sealed this

Twenty-ninth Day of February, 2000

Attest:

Q. TODD DICKINSON

Attesting Officer

Commissioner of Patents and Trademarks